Patented Mar. 4, 1952

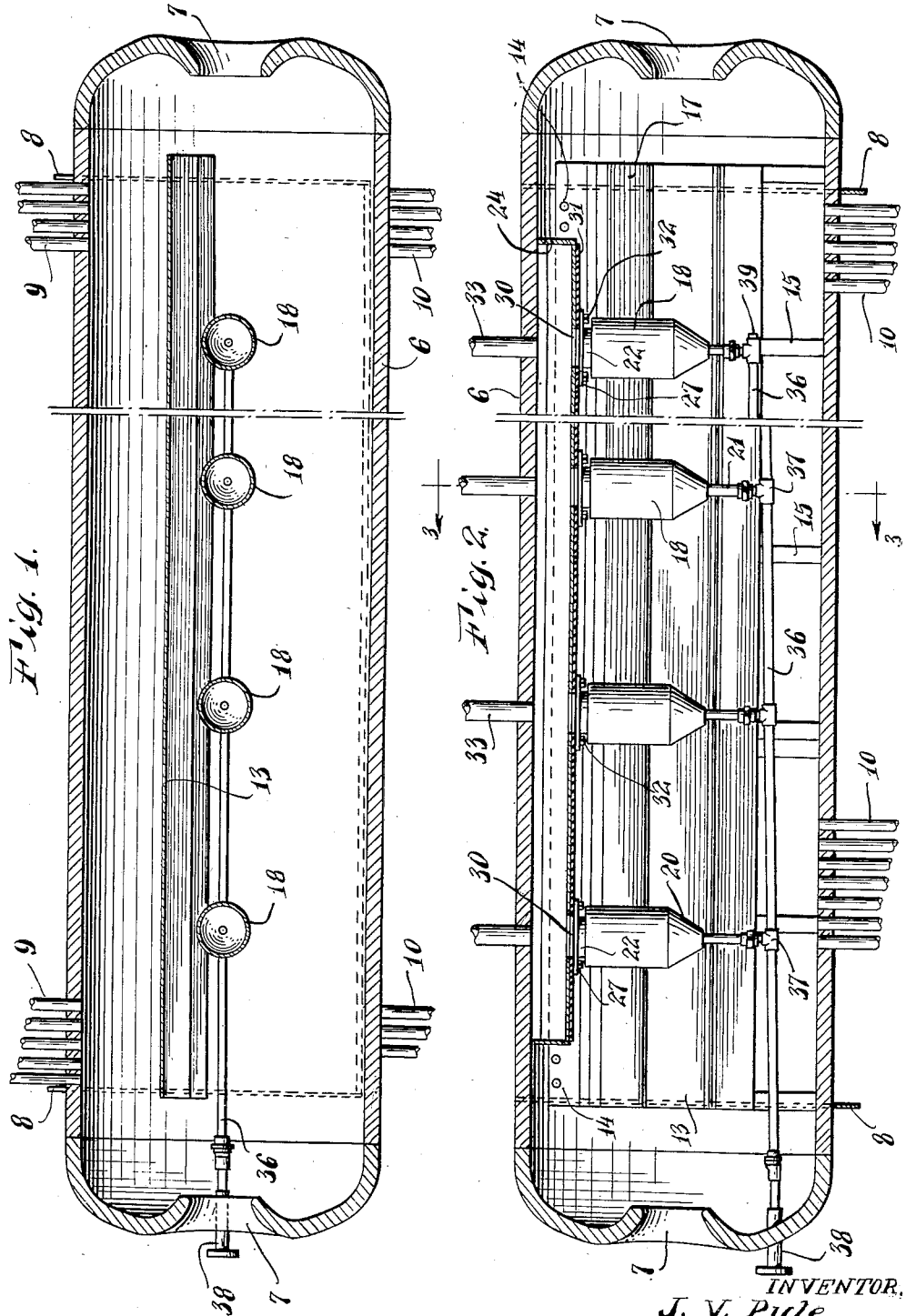

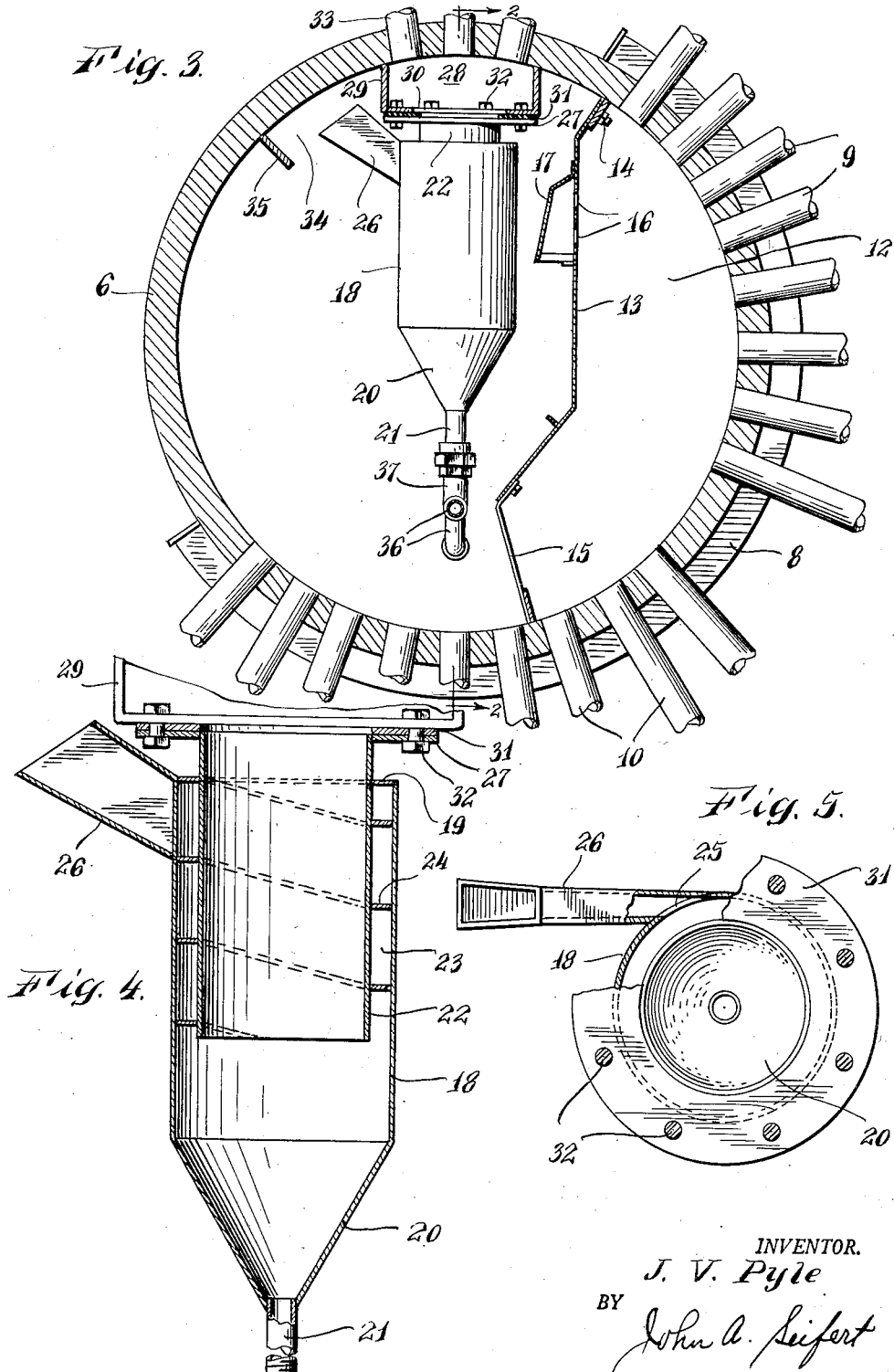

2,587,761

UNITED STATES PATENT OFFICE 2,587,761

MEANS TO SEPARATE WATER AND FOREIGN SUBSTANCES FROM STEAM

John V. Pyle, Pleasantville, N. Y., assignor to Kennedy-Van Saun Mfg. & Eng. Corporation, New York, N. Y., a corporation of Delaware Application October 25, 1949, Serial No. 123,389

4 Claims. (Cl. 183—83)

This invention relates to means to separate water and foreign substances from steam in a steam and water drum of steam generators.

The present application is a continuation-in-part of application Serial No. 561,366 filed November 1, 1944, as a division of application Serial No. 469,881 filed December 23, 1942 both said applications being now abandoned.

In modern steam generators or boilers due to the high heat input into the steam generating tubes greater steam generation is attained by generating steam at higher rates and producing higher operating pressures with a consequent high velocity discharge of generated steam and water by the steam generating tubes into the steam and water drum, which not only tends to maintain the mixture of the water with the steam in the drum, but also sets up turbulence of the water in the drum and a mixing of the water in the drum with the steam resulting in the entrainment of water and foreign substances with the steam vapors and the discharge of a highly saturated steam with foreign substances entrained in the steam from the steam and water drum.

It is an object of the present invention to overcome the above difficulties by the provision of improved means for separating water and foreign substances from the steam, and comprising a cyclone separator out of communication with the water in the steam and water drum having a restricted inlet in communication with the steam space in the steam and water drum for the entrance of steam, or steam having water and foreign substances mixed therewith, into said separator and adapted by the high pressure in the drum and the entrance velocity of the steam with water and foreign substances into said separator due to the high velocity discharge of the steam and water by the steam generating tubes to effect a whirling action of the steam and water in the separator and separation of water and foreign substances by centrifugal action and gravitation and said separator having an outlet for the separated steam vapors to the exterior of the drum and an outlet for the separated water and foreign substances to the exterior of the drum whereby the discharge of the separated water and foreign substances will not set up turbulence of the water in the drum and a consequent turbulent action of the water and mixing of the water and foreign substances with the steam in the drum.

It is another object of the invention to provide in a steam generator or boiler including a steam and water drum and steam generating tubes discharging the generated steam and water with entrained foreign substances into the drum, a separator for separating water and foreign substances from the steam vapors arranged in the drum, comprising a casing with the axis thereof disposed in a vertical plane, said casing including a cylindrical body and a hopper bottom, and a manifold for the separated water and foreign substances connected to the hopper bottom leading to the exterior of the drum and an outlet conduit for the separated steam communicating with steam outlet tubes in the uppermost wall portion of the drum and extended through the upper end of the casing and opening to the casing above the juncture of the hopper bottom with the body and forming with the side wall of the body an annular chamber open at the bottom to the casing and having a spiral vane therein forming a spiral passage in said chamber, and said casing having a steam inlet conduit opening tangentially through the side wall of the body to the upper end of said spiral passage and to the steam space in the drum for the entrance of steam having water and foreign substances mixed therewith from the drum into the casing, the pressure in the drum and the entrance velocity of the steam with entrained water and foreign substances into the casing setting up a whirling action of the same in the casing chamber and effecting separation of the water and foreign substances by centrifugal action from the steam vapors in the spiral passage, the separated water and foreign substances gravitating out of the steam into the hopper bottom and the discharge manifold.

Another object of the invention is to provide a steam pocket in the upper portion of the steam and water drum into which the inlet end of the steam inlet conduit of the separator is extended.

A further object of the invention is to provide a baffle plate or wall in the steam and water drum between a wall portion of said drum arranged with steam and water inlet tubes and the cyclone separator and arranged to direct the incoming steam and water in a downward direction parallelly of the cyclone separator and separate and direct steam into the steam pocket.

Other objects and advantages of the invention will be apparent from the detailed description of the invention.

In the drawings accompanying and forming a part of this application, Figure 1 is a longitudinal section taken on the horizontal axis of a steam and water drum showing the invention in plan view embodied therein.

Figure 2 is a longitudinal section taken on the vertical axis of the steam and water drum showing the invention in elevation embodied therein.

Figure 3 is a cross sectional view, on an enlarged scale, taken on the line 3—3 of Figure 2 looking in the direction of the arrows.

Figure 4 is a sectional view in elevation of a cyclone separator.

Figure 5 is a top plan view of the cyclone separator showing in section the connection between the steam inlet conduit and spiral passage.

The invention is shown embodied in a steam and water drum 6 having manholes 7 in the opposite end walls which are closed when the drum is in use. The drum is adapted to be mounted on a furnace setting by semi-circular mounting members 8. Steam and water mixtures are delivered to the drum through tubes 9 in a side wall portion of the drum, and water is discharged from the drum through tubes 10 in the lower wall portion of the drum, as shown in Figure 3.

The mixture of steam and water is discharged from the tubes 9 into a pocket or chamber 12 extending longitudinally of the side wall portion of the drum arranged with said tubes. This chamber is formed by a baffle wall 13 having the upper longitudinal edge portion bent in an outward oblique direction and secured to brackets on the inner surface of the drum, as shown at 14 in Figures 2 and 3. The lower longitudinal edge portion of the baffle wall 13 is bent in an inward oblique direction and supported in spaced relation from the lower wall portion of the drum by brackets 15 spaced along said wall portion of the drum. The intermediate portion of the baffle wall extends in a vertical plane and is provided with a series of slots 16 adjacent the upper edge portion. A hood shaped baffle 17 is mounted on the surface of the baffle wall 13 exterior of the chamber 12 with the wall thereof in opposed spaced relation to the slots 16, whereby the slots will separate the water and foreign substances from the steam to a certain extent and the steam flowing through the slots is directed in a downward direction along the baffle wall 13. The baffle wall directs the water separated from the steam by the slots to the bottom portion of the drum to be discharged from the drum through the tubes 10.

The water and foreign substances remaining entrained with the steam are separated from the steam in the drum 6 by a cyclone separator or a plurality of cyclone separators as shown in the present illustration of the invention, the number of separators depending on the size of the steam and water drum. The separator or separators are mounted on the vertical center of the drum and each separator comprises a cylindrical casing 18 having an annular inwardly extending flange 19 at the upper end and a hopper bottom 20 arranged with an outlet pipe 21 in the apex thereof, as shown in Figure 4. The upper portion of the casing 18 is arranged with an annular space or chamber by a conduit or tubular member 22 extended through the opening formed by the flange 19 and secured to said flange as by welding with the lower end of said member 22 spaced above the hopper bottom 20. A spiral passage 23 is formed in the annular space between the casing 18 and member 22 by a spiral vane 24 secured to the member 22 as by welding. The upper end of the passage 23 is in communication with an opening 25 in the wall of the casing arranged with a conduit 26 extending in an upward oblique direction from and tangentially of the casing, as shown in Figures 4 and 5. The walls of the conduit 26 are tapered toward the casing and the cross sectional shape of the conduit is merged with the cross sectional shape of the spiral passage 23. The upper end portion of the conduit member 22 is extended from the upper end of the casing 18 and provided with a flange 27 for mounting the cyclone separators to the bottom wall of a separated steam chamber 28 extending longitudinally of the upper wall portion of the drum 6. This chamber is formed by a housing 29 secured at the edges of the side walls thereof to the inner surface of the drum as by welding and the bottom wall arranged with spaced openings 30 for registering the upper ends of the conduits 22 therewith. The connections between the openings 30 and the conduits 22 are sealed by a gasket 31, as shown in Figures 2, 3 and 4. The cyclone separators are secured to the housing 29 by bolts 32. The separated steam in the chamber 28 is discharged to a desired unit, such as a superheater, or directly to a place of use of said steam, such as a turbine, through steam outlet tubes 33 in the upper wall portion of the drum communicating with said chamber to receive steam therefrom.

The inlet ends of the conduits 26 are extended into a steam pocket 34 extending longitudinally of the chamber 28 and formed by a side wall of the housing 29 and a wall 35 secured to the inner surface of the drum wall and extended therefrom in spaced relation to said side wall of the housing, as shown in Figure 3. The steam flowing through the slots 16 is directed by the lower portion of the baffle wall 13 toward the pocket 34. The steam and entrained water and foreign substances collecting in said pocket flows through the conduits 26 into the spiral passages 23 of the separators at an increased rate of flow whereby the water and foreign substances entrained with the steam are separated from the steam by centrifugal action and thrown outwardly to the side walls of the casings 18 and the steam discharged in a spiral stream from the passages into the conduit 22 to flow in an upward direction. The water and foreign substances gravitate down the side walls of the casings into the hopper bottoms 20 and through the pipes 21.

The water and foreign substances are discharged from the pipes 21 into a manifold 36 connected in communication with the pipes 21 by unions 37 and sloping toward one end of the drum where the lower end of the manifold is connected in communication with a coupling member 38 mounted in the end wall of the drum, as shown in Figures 1 and 2. The coupling member is adapted to be connected to a conduit, not shown, which delivers the separated water and foreign substances to a suitable place of disposal or to means to separate the foreign substances from the water. The upper end of the manifold 36 is closed by a plug 39, as shown in Figure 2. The manifold is caused to slope by progressively increasing the length of the pipes 21 toward the end of the drum arranged with the coupling member 38, as shown in Figure 2.

In the operation of the invention, steam from the steam generating units of a boiler is delivered to the drum 6 through tubes 9 and said steam entering the drum is diverted from the cyclone separators 18—26 and directed to flow to the bottom portion of the drum and to the steam pocket 34. The steam in the pocket 34 flows at an increased rate into the cyclone separators through the steam inlets 26. The steam entering the cyclone separators flows in a downward spiral at a high rate of speed resulting in the water and foreign substances being thrown against the side walls of the casings 18 and gravitating into the hopper bottoms 20 and the discharge manifold 36 and the steam freed of the water and foreign substances flowing upwardly through the conduits 22 into the steam chamber 28 and the outlet tubes 33.

Having thus described my invention, I claim:

1. In means to separate water and foreign substances from steam, a steam and water drum having steam outlet tubes in the upper wall portion and said drum arranged with a longitudinal steam pocket in the upper portion thereof, a cyclone separator mounted in the drum and having a separated steam outlet in the upper end communicating with the steam outlet tubes of the drum, a water and foreign substances outlet in the lower end and a steam inlet extending into the steam pocket of the drum and extending tangentially into the upper portion of the separator, and a manifold extending longitudinally of the bottom portion of the drum and through an end wall of the drum and connected in communication with the water and foreign substances outlet of the cyclone separator for the discharge of water and foreign substances from the drum.

2. Means to separate water and foreign substances from steam as claimed in claim 1, wherein the drum is arranged with a separated steam chamber extending longitudinally of the upper wall portion thereof between and in communication with the steam outlet tubes and the separated steam outlet of the cyclone separator, and the steam pocket is formed by a longitudinal wall extended inwardly from the wall of the drum in spaced relation to the separated steam chamber to form the steam pocket with said steam chamber and the drum wall.

3. Means to separate water and foreign substances from steam as claimed in claim 1, wherein the drum is provided with steam and water tubes in a side wall thereof, a baffle wall secured at the upper and lower edges to the drum and interposed between the steam and water tubes and the cyclone separator and said baffle wall arranged with slots in an intermediate portion thereof, and a hood shaped baffle mounted on the baffle wall in spaced relation between the slots and the cyclone separator to direct the flow of steam from the slots in a downward direction between the baffle wall and the cyclone separator.

4. Means to separate water and foreign substances from steam as claimed in claim 1, wherein the cyclone separator comprises a cylindrical casing closed at the top and having a hopper bottom arranged with an outlet communicating with the discharge manifold, a conduit extended through the closed top of the casing with the lower end of the conduit spaced above the hopper bottom and the upper end of the conduit communicating with the steam outlet tubes and constituting the separated steam outlet and said conduit forming an annular space in the upper portion of the casing, a spiral vane spanning said annular space and forming a spiral passage around the conduit, and a second conduit extending in a downward oblique direction and tangentially of the casing and communicating with the upper end of the spiral passage to constitute the steam inlet to the casing.

JOHN V. PYLE.

REFERENCES CITED

The following references are of record in the file of this patent:

UNITED STATES PATENTS

| Number | Name | Date |
| --- | --- | --- |
| 1,107,485 | Bowser | Aug. 18, 1914 |
| 1,946,248 | Weigel | Feb. 6, 1934 |
| 1,948,524 | Kerr | Feb. 27, 1934 |
| 2,050,615 | Kuhner | Aug. 11, 1938 |
| 2,191,671 | Kuhner | Feb. 27, 1940 |
| 2,214,658 | Browning | Sept. 10, 1940 |
| 2,346,005 | Bryson | Apr. 4, 1944 |